Aug. 25, 1959 E. J. WAY 2,901,256
PENTAGONAL BLOCK PUZZLE
Filed Oct. 13, 1954
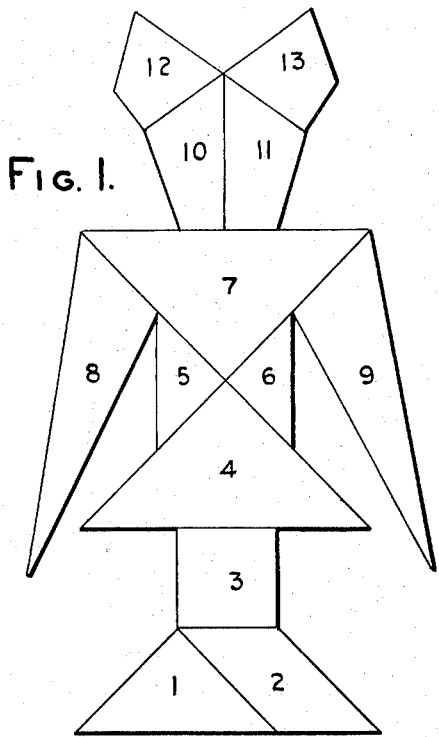
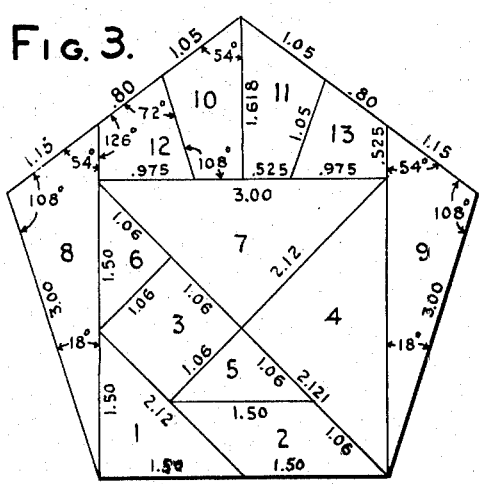
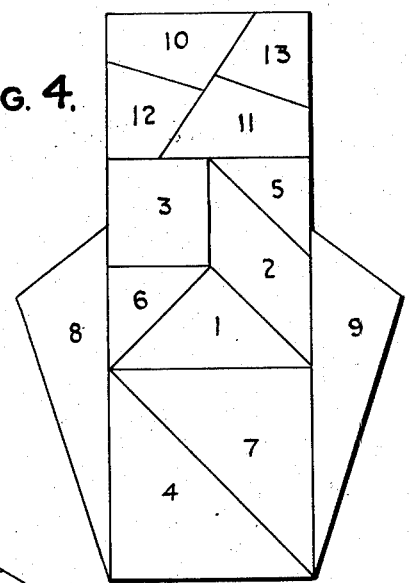
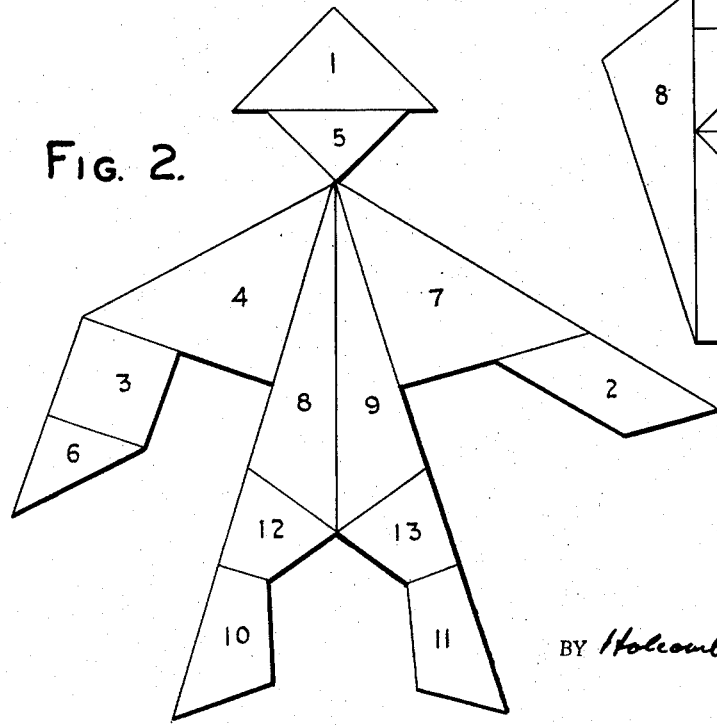
INVENTOR
ELWOOD J. WAY
BY *Holcombe, Wetherill & Brisebois*
ATTORNEYS

2,901,256
PENTAGONAL BLOCK PUZZLE
Elwood J. Way, Washington, D.C.
Application October 13, 1954, Serial No. 462,045
2 Claims. (Cl. 273—157)

This invention relates to block puzzles of the type comprising flat pieces of different geometrical shapes and dimensions which may be assembled in a variety of ways so as to form fanciful designs, and it consists in a set of thirteen pieces, seven having three sides and six having four sides, which may be arranged to form a regular pentagon.

Puzzles of this type furnish entertainment suitable for both young and old persons, with or without good vision, and are practically indestructible provided care is used not to lose any of the pieces.

The object of my invention is to provide a puzzle consisting of small tiles or blocks from which a regular pentagon may be constructed, utilizing tiles or blocks, the angles, dimensions and shapes of which are adapted to the formation of a multiplicity of designs, or figures, of a fanciful or abstract nature, using for such purposes all the tiles provided.

Illustrative patterns of such designs are shown in the accompanying drawings, wherein Figs. 1 and 2 are fanciful figures of block men in different postures showing the arrangement of the individual pieces in each; Figure 3 illustrates the pieces arranged in the form of a regular pentagon; and Figure 4 illustrates the pieces arranged in the form of a solid object such as a vase. In Figure 3, the angles and dimensions of the several pieces are noted for guidance in constructing the set in accordance with the invention.

For the purposes of description, the pieces are advantageously divided into two groups according to the angles that their sides make with each other, there being seven pieces, numbered from 1 to 7, respectively, having one or more angles of 45°, 90° and 135°, and six pieces, numbered from 8 to 13, respectively, having one or more angles of 18°, 54°, 72°, 90°, 108° and 126°.

The size of the pentagon to be constructed is immaterial to the object of the invention, that is, it may be of any convenient size. Since the angular characteristics are the same regardless of size, the pieces will be described as prepared for a regular pentagon 3″ long on each side, as shown in Figure 3.

Pieces 1 to 7 (45° base)

An isosceles right angle triangle is shown in piece 1, the sides of which are one-half the side of the pentagon in length, that is 1.5″. The hypotenuse is $$\sqrt{(1.5)^2 + (1.5)^2}$$

or 2.12″ long.

Piece 2 is a parallelogram having angles of 45° and 135°, the long sides of which are 1.5″ (one-half the side of the pentagon), distant ¾″ from each other (one-quarter of the side of the pentagon), and the short sides are $$\sqrt{\frac{(1.5)^2}{2}}$$

or 1.06″ long.

Piece 3 is a square, the diagonal of which is 1.5″ (one-half the side of the pentagon) and the sides $$\sqrt{\frac{(1.5)^2}{2}}$$

or 1.06″ long.

Pieces 4 and 7 are identical, each forming an isosceles right angle triangle, the hypotenuse of which is equal to the side of the pentagon to be constructed, viz. 3″, having two sides the length of which is $$\sqrt{\frac{(3)^2}{2}} (\sqrt{4.5} = 2.12'')$$

Pieces 5 and 6, which are identical, are isosceles right angle triangles, the hypotenuse of which is one-half the side of the pentagon, 1.5″, and the sides are 1.06″ in length $$\left(\sqrt{\frac{(1.5)^2}{2}} = 1.06''\right)$$

Pieces 8 to 13 (108° base)

Pieces 8 and 9 are identical in their dimensions and are symmetrical triangles having angles of 18°, 54° and 108°, the side opposite the 54° angle being equal to the side of the pentagon. The side opposite the 18° angle is 1.15″ in length and the side opposite the 108° angle is 3.52″ in length.

Pieces 10 and 11 are identical in their dimensions and are symmetrical four-sided pieces having angles of 90°, 108°, 108° and 54°, the sides adjacent to and in the same sequence as the angles, the lengths of which are .525″, 1.05″, 1.05″ and 1.618″, respectively. The dimensions are derived from the pentagon, the side 1.618″ being the vertical height of the largest small pentagon which may be erected upon a three inch square drawn within the three inch pentagon, with one side coincident with one side of the pentagon, the opposite side of the square and the base of the small pentagon being on the same line and the two opposite sides of the small pentagon being coincident with two sides of the large pentagon. The two 1.05″ dimensions are two sides of the small pentagon and the .525″ dimension is one-half the side of the small pentagon. The length of a side of the small pentagon is equal to the length of a side of the large pentagon minus this length times twice the tangent of 18 degrees.

Pieces 12 and 13 are identical in their dimensions and are symmetrical four-sided pieces having angles of 72°, 72°, 126° and 90°, the sides adjacent to and in the same sequence as the angles with the following lengths, respectively, 1.05″, .80″, .52″, and .97″. These pieces occupy the remaining space in the pentagon having 3″ sides after placing the other 11 pieces. (See assembly drawing—Fig. 3.)

The assembly of the pentagon is accomplished by placing the respective pieces in the pattern shown in Figure 3. The seven pieces comprising group 1, having angles of 45°, 90° and 135°, are so placed as to form a 3″ square. The pieces in group 2, having angles of 18°, 54°, 72°, 90°, 108° and 126°, are arranged to supplement the square. For example, either of the pieces 8 or 9 which have an 18° angle, when placed with this angle adjacent to the 90° angle of the square, forms a 108° angle which is the interior angle of a pentagon. These two pieces having 18° angles also have an angle of 108°, which will form two more of the interior angles of the pentagon. Two other pieces, 10 and 11, have an interior angle of 54° and when placed together they form the remaining 108° angle of the pentagon. Having progressed to this point, it becomes evident that the two remaining pieces of group 2, 12 and 13, will fill the space to complete the pentagon. The placing of all 13 pieces is shown in Figure 3.

Attention is directed to the fact that the 7 pieces in group 1 have collectively 23 sides but only four different dimensions, while the 6 pieces in group 2 have collectively 22 sides and 8 dimensions. Some of the dimensions are common to each group or approximately so, and by turning over one member of a symmetrical pair both become identical in shape. These characteristics of the pieces are stated to show the infinite number of combinations which can be made in designs which approach a solid figure and in addition the pieces may be placed in figures or designs less solid in a great variety of ways.

Figure 1, for example, consists of a foot and leg portion composed of pieces 1, 2 and 3, a body portion composed of pieces 4, 5, 6 and 7, two arms formed by the pieces 8 and 9, and a neck and head portion composed of the pieces 10, 11, 12 and 13.

In the block man illustrated in Figure 2, the head and neck portion is composed of the pieces 1 and 5, the body and upper arm portions are composed of pieces 4, 7, 8 and 9, the lower arms are formed by the pieces 2, 3 and 6, and the feet and legs are formed by the pieces 10, 11, 12 and 13.

Figure 4 illustrates a solid block figure having an upper portion composed of the four pieces 10, 13, 11 and 12, arranged to form a horizontally disposed rectangle surmounting a vertically disposed rectangle composed of the seven pieces, 3, 5, 2, 6, 1, 7 and 4, on each flank of which vertically disposed rectangle are side wing pieces 8 and 9.

Other patterns may be devised from these thirteen blocks in considerable variety, but the four shown sufficiently illustrate the manner of use of blocks shaped to embody my invention.

I claim the following:

1. A block puzzle comprising a set of thirteen blocks constituting a regular pentagon when assembled in juxtaposition, seven of said blocks comprising at least three different types of polygons, each having at least two equal sides and angles of 45° and multiples thereof, the length of at least one side on a plurality of said seven blocks being equal to an even multiple of the length of at least one side on a plurality of the remainder of said seven blocks, said seven blocks forming an interior square having one side coincident with one side of the pentagon, and six of said blocks having angles of 18° and multiples thereof, two of said group of six blocks constituting side blocks each having one side equal in length to one side of said pentagon and each of said side blocks filling the space adjacent to one side of said square between said side and the adjacent side of said pentagon, and the remaining four of said group of six blocks each having one right angle and fitting together with one side of each in longitudinal alinement coincident with the fourth side of said square forming a line equal in length thereto and filling the space between said side of the square and the two sides of said pentagon remote from the side thereof which is coincident with the first named side of said square, two of said four blocks forming an interior pentagon within said first named pentagon and having two sides coincident with an apex of said first named pentagon, said two sides being of equal length and of the same length as two adjacent sides thereof and also of the same length as contiguous sides of the other two blocks of said group, and said first two of said four blocks each having one side of the same length as a non-adjacent side of each of said two other blocks of said group, each of said non-adjacent sides extending in the same line as one of the sides of said square contiguously to the inner side of one of said side blocks, whereby a large number of arrangements may be made wherein groups of adjoining blocks have contiguous sides of the same length.

2. A block puzzle of the kind set forth in claim 1 wherein the length of one side of the small pentagon is equal to that of one side of the large pentagon minus twice that length times the tagent of 18°.

References Cited in the file of this patent

UNITED STATES PATENTS

| 143,835 | Muller | Oct. 21, 1874 |
| 1,656,117 | Joseph | Jan. 10, 1928 |

FOREIGN PATENTS

| 1,001,145 | France | Oct. 17, 1951 |